(12) United States Patent
Lhermite et al.

(10) Patent No.: US 12,716,542 B2
(45) Date of Patent: Aug. 25, 2026

(54) TOOL CARRIER COMPRISING A WHEEL DRIVING MODULE, AND TOOL CARRIER TRAIN

(71) Applicant: WESTINGHOUSE ELECTRIC NUCLEAR FIELD SERVICES FRANCE, Mondragon (FR)

(72) Inventors: Vincent Lhermite, Châteauneuf le Rouge (FR); Grégory Mas, Valréas (FR); Franck Pilisi, Saint Alexandre (FR)

(73) Assignee: WESTINGHOUSE ELECTRIC NUCLEAR FIELD SERVICES FRANCE, Mondragon (FR)

( * ) Notice: Subject to any disclaimer, the term of this patent is extended or adjusted under 35 U.S.C. 154(b) by 0 days.

(21) Appl. No.: 19/080,134

(22) Filed: Mar. 14, 2025

(65) Prior Publication Data

US 2025/0290591 A1 Sep. 18, 2025

(30) Foreign Application Priority Data

Mar. 15, 2024 (EP) .................................... 24305398

(51) Int. Cl.

*F16L 55/32* (2006.01)
*B60G 5/00* (2006.01)

(Continued)

(52) U.S. Cl.

CPC ................ *F16L 55/32* (2013.01); *B60G 5/00* (2013.01); *B62D 61/12* (2013.01); *B62D 63/04* (2013.01); *F16L 2101/30* (2013.01)

(58) Field of Classification Search

CPC ........ F16L 55/32; F16L 2101/30; B60G 5/00; B62D 61/12; B62D 63/04

See application file for complete search history.

(56) References Cited

U.S. PATENT DOCUMENTS 4,993,912 A * 2/1991 King ..................... B62D 61/12 89/929
5,882,241 A * 3/1999 Mullaney .............. A63H 17/36 446/454

(Continued)

FOREIGN PATENT DOCUMENTS

KR 20220075796 A 6/2022
WO 2022194464 A1 9/2022

OTHER PUBLICATIONS

European Search Report for EP24305398.0 dated Jun. 20, 2024, 9 pages.

*Primary Examiner* — Toan C To

(74) *Attorney, Agent, or Firm* — NIXON & VANDERHYE

(57) ABSTRACT

A tool carrier, and tool carrier train, includes a support frame and a driving module, mounted on the support frame, the driving module being configured to move the support frame along a direction, named driving direction X, the driving module including two wheels, one of the two wheels being named front wheel, and another of the two wheels being named rear wheel, the driving module further including at least one motor assembly which is configured to drive at least one wheel among the front wheel and the rear wheel, and the driving module including at least one engaging system which is configured to engage or disengage the at least one wheel among the front wheel and the rear wheel with the motor assembly.

14 Claims, 9 Drawing Sheets

(51) Int. Cl.

| | |
|---|---|
| ***B62D 61/12*** | (2006.01) |
| ***B62D 63/04*** | (2006.01) |
| *F16L 101/30* | (2006.01) |

(56) References Cited

U.S. PATENT DOCUMENTS

| | | | | |
|---|---|---|---|---|
| 6,039,626 | A * | 3/2000 | Gerold | A63H 30/04 446/268 |
| 6,113,343 | A * | 9/2000 | Goldenberg | B25J 19/005 239/587.2 |
| 9,057,474 | B2 * | 6/2015 | Choi | F16H 48/10 |
| 2004/0164505 | A1 * | 8/2004 | Clemens | B60K 7/0007 280/6.154 |
| 2005/0145428 | A1 * | 7/2005 | Chun | B60G 17/0157 180/209 |
| 2010/0243357 | A1 * | 9/2010 | Yim | B25J 5/007 180/218 |
| 2015/0140895 | A1 * | 5/2015 | Huang | A63H 29/24 446/429 |
| 2015/0152992 | A1 | 6/2015 | Choi et al. | |
| 2016/0089283 | A1 * | 3/2016 | DeLuca | A61G 7/08 180/413 |
| 2020/0215866 | A1 * | 7/2020 | Hoter Ishay | B60G 17/0165 |
| 2021/0379952 | A1 * | 12/2021 | Zhou | B66F 9/07586 |

* cited by examiner 1
5
2
4
α
3

TOOL CARRIER COMPRISING A WHEEL DRIVING MODULE, AND TOOL CARRIER TRAIN

CROSS-REFERENCE TO RELATED APPLICATIONS

This application claims priority to EP 24305398.0 filed Mar. 15, 2024, the entire contents of which are hereby incorporated by reference.

TECHNICAL FIELD

The invention deals with a tool carrier, and more particularly with a tool carrier comprising a driving module provided with wheels.

BACKGROUND OF THE INVENTION

A plant, for example a nuclear power plant, generally comprises piping.

Such a piping needs to be kept in good condition in order to comply with safety requirement or reduce plant downtime.

To this end, it is often desired to examine and/or repair the piping.

Therefor, a tool carrier may have to be introduced in the piping, for inspection of at least a part of it, and/or perform any work which may be necessary.

However, such a piping can comprise pipes of various diameter, of various length, and/or of any inclination (horizontal, vertical, or of any slope).

Besides, it may be necessary that the tool carrier could be able to move forward or backward, and/or to pass an elbow between two successive straight pipes.

SUMMARY OF THE INVENTION

The invention relates to a tool carrier.

Accordingly, the tool carrier comprises a support frame and at least one driving module, mounted on the support frame, the driving module being configured to move the support frame, and so the tool carrier, along a direction, named driving direction "X".

The driving module here comprises two wheels: one of the two wheels being named front wheel, and another of the two wheels being named rear wheel. Of course, "front wheel" and "rear wheel" are arbitrary names as the tool carrier can move back and forth along the driving direction, as described later.

According to one example embodiment, the at least one wheel comprises a frame part and at least one sub-wheel.

The at least one sub-wheel is configured to pivot on the frame-part. For example, the frame part comprises a hub about which the sub-wheel can pivot.

According to an example embodiment, the at least one wheel is a double-wheel. Thus, the at least one wheel comprises two sub-wheels making the double-wheel.

For example, the frame part is therefore between the two sub-wheels. According to the invention, the driving module further comprises at least one motor assembly which is configured to drive at least one wheel among the front wheel and the rear wheel, or for example both the front wheel and the rear wheel.

The tool carrier thus forms a motorized robot trolley able to move, in particular through pipes.

According to one example embodiment, the driving module comprises only one motor assembly to drive both wheels.

According to one example embodiment, the two wheels are synchronized, i.e. they are configured to turn together, at a same speed.

According to one example embodiment, the at least one motor assembly can drive the at least one wheel according to a first direction, and according to a second direction, opposite to the first direction, along direction X.

In other words, the at least one motor assembly can comprise a dual direction motor.

The tool carrier can thus move forward and backward.

According to one example embodiment, the front wheel and the rear wheel are aligned one behind the other along the driving direction X.

According to one example embodiment, the driving module can comprise at least one bogie, the at least one bogie being mounted on the support frame and the front wheel and the rear wheel being mounted on the bogie.

According to one example embodiment, the driving module comprises at least one engaging system which is configured to engage or disengage the at least one wheel among the front wheel and the rear wheel with the motor assembly.

According to one embodiment, the other wheel can be a free wheel. According to another embodiment, the engaging system is configured to engage or disengage each of the front wheel and the rear wheel, optionally independently.

The tool carrier is thus able to move, forward or backward, in a pipe, and each of the wheels can be free when desired.

In particular, having the wheels free facilitates getting the tool carrier back, or eases pulling it out of the piping.

According to one example embodiment, the at least one wheel is connected by a pivot connection to the bogie.

For example, the pivot connection is off-center compared to the hub.

Owing to this, when the wheel rotates about the pivot connection in a first way, the wheel is engaged with the motor assembly. When the wheel rotates about the pivot connection in a second way, opposite the first way, the wheel is disengaged, and so the wheel is free.

Whatever the situation is, the at least one sub-wheel can still turn about the hub.

According to one example embodiment, the engaging system comprises a pushing finger.

The pushing finger is for example mounted on the bogie and is configured to disengaged the wheel from the motor assembly.

For example, the pushing finger comprises a root, which is fixed to the bogie, and a tip which rests against a stop of the frame part of the wheel.

For example, the pushing finger also comprises a spring configured to push the tip far from the root.

Then, if a force F is applied onto the wheel, the force F being greater than a corresponding force of the spring the wheel rotates the first way, and then engages with the motor assembly.

In absence of force applied to the wheel, the spring of the pushing finger pushes the wheel back so that it is disengaged from the motor assembly.

According to one example embodiment, at least one wheel among the front wheel and the rear wheel, for example at least the wheel driven by the motor assembly, is movable between a retracted position, in which the wheel is at a distance relative to the support frame, and a deployed position, in which the wheel is at a greater distance from the support frame than in the retracted position, i.e. further from the support frame, according to a radial direction "Y", which is orthogonal to the driving direction "X".

In other words, the wheel in the deployed position is taken away from the support frame, compared to the retracted position.

For example, the wheel can take any intermediate position between the retracted position and the deployed position.

According to one example embodiment, each of the front wheel and the rear wheel is movable between a retracted position, and a deployed position in which the wheel is further from the support frame than in its retracted position. For example, each wheel can take any intermediate position between the retracted position and the deployed position.

The tool carrier then has at least one configuration, named closed configuration, in which the front wheel and the rear wheel are in their retracted position, and another configuration, named expanded configuration, in which the wheels are in the deployed position.

Then, the tool carrier can take any intermediate configuration between the closed configuration and the expanded configuration, depending on the position of the wheels. For example, one of the wheels can be in retracted position while the other is in deployed position.

A tool carrier as described above can thus be relatively compact, while it can expand and therefore adapt to dimensions of a pipe in which it is inserted. It can also be retracted to ease its removal from piping.

According to one example embodiment, the driving module comprises at least one deployment system, the deployment system being configured to move radially, i.e. according to direction Y, the at least one wheel among the front wheel and the rear wheel between the retracted position and the deployed position, compared to the support frame.

For example, the deployment system can comprise at least one actuator, for example comprising a hydraulic or pneumatic cylinder.

For example, the hydraulic or pneumatic cylinder gets power from a hydraulic, or liquid or gaseous fluid, under pressure.

For example, the fluid comprises oil, water or air.

The hydraulic or pneumatic cylinder comprises a cylinder barrel, and a piston comprising a piston head and a piston rod which is connected to the piston head, and the piston head is configured to move back and forth in the cylinder barrel. Thus, the piston head divides an internal volume of the cylinder barrel into two chambers: a first of the two chambers receives the fluid, and the other of the two chambers surrounds the piston rod.

For example, the support frame comprises the cylinder barrel.

According to one example embodiment, the deployment system further comprises at least one spring configured to push the piston head and pressurize the fluid when it is in the first chamber.

Thus, while a pressure of the fluid in the first chamber is lower than a spring return force, or for example without fluid in the chamber, the hydraulic or pneumatic cylinder is contracted, and the at least one wheel of the driving module is in retracted position.

According to one example embodiment, the deployment system further comprises a sliding part, and the sliding part is linked to the piston.

Here, a link between the sliding part and the piston is a fixed link in translation so that any translational movement of the piston leads a movement of the sliding part along a same direction. But, the sliding part can pivot in relation to the piston about said direction, or be fix in rotation too.

According to one example embodiment, the deployment system further comprises a main connecting rod.

According to one example embodiment, the main connecting rod is connected at one end to the sliding part by a pivot connection, and at another end to the bogie by a pivot connection too.

In an embodiment without a bogie, the main connecting rod can be connected to a frame piece linking the wheel to the support frame, via pivot connections.

According to one example embodiment, the deployment system further comprises an anchoring part which is fixed, immobilized, in relation to the support.

For example, the deployment system further comprises a secondary connecting rod.

For example, the secondary connecting rod is connected at one end to the anchoring part by a pivot connection, and at another end to the main connecting rod by a pivot connection too.

For example, a deployment system which is configured to move radially the front wheel is here named front deployment system.

For example, a deployment system which is configured to move radially the rear wheel is here named rear deployment system.

According to one example embodiment, the driving module comprises both a front deployment system and a rear deployment system.

According to one example embodiment, the driving module can comprise at least one tilting system configured to tilt the bogie relative to the support frame.

The tilting system designates a system which is configured to move and tilt the bogie relative to the support frame, in particular compared to the radial direction.

Thus, at least one wheel among the front wheel and the rear wheel can move between the retracted position and the deployed position while moving the bogie compared to the support frame.

For example, the front wheel can be in its retracted position while the rear wheel can be in its deployed position, owing to a tilt of the bogie. Thanks to a tiltable bogie, the tool carrier can move within a conical pipe.

According to one example embodiment, the tilting system comprises the front deployment system and the rear deployment system, and the rear deployment system is in mirror compared to the front deployment system.

According to one example embodiment, the above-described driving module is a first driving module, and the tool carrier also comprises at least a second driving module.

According to one example embodiment, the tool carrier even comprises three driving modules, i.e. the first, the second and a third driving module.

The case being, the three driving modules can be arranged around the support frame, for example every 120° around the driving direction.

The support frame is thus surrounded by driving modules, which is particularly convenient to move the tool carrier in piping.

According to one example embodiment, when there is at least two driving modules, at least two of the driving modules, or even all the driving modules, are identical.

According to one example embodiment, support frame comprises a front synchronization mechanism configured to synchronize the front deployment systems of all the driving modules.

Then, all the front wheels of one tool carrier can move between a deployed position of a retraced position together, in a same way, so that the support frame remains central compared to the tool carrier.

According to one example embodiment, support frame comprises a rear synchronization mechanism configured to synchronize the rear deployment systems of all the driving modules.

Then, all the rear wheels of one tool carrier can move between a deployed position of a retraced position together, in a same way, so that the support frame remains central compared to the tool carrier.

According to one example embodiment, the tool carrier can comprise at least one tool compartment.

For example, the tool compartment can be provided with a tool.

For example, the tool can comprise, a mechanical tool for machining, milling, grinding, levelling and flapping; a NDT (non-destructive testing) inspection tool, for example for visual inspection, ultrasonic testing (UT), eddy current testing (ET), dimensional, profilometry or 3D scanner, moulding; a grabbing tool, for example a gripping tool (plier, hook, suction, or even a vacuum system), or other as desired.

According to one example embodiment, the tool carrier can comprise at least one camera compartment.

For example, the camera compartment can be provided with a camera.

A camera here designates any visual analysis system.

According to one example embodiment, the tool carrier can comprise several camera compartments, for example at least two, or five, or even at least ten. For example, each camera compartment can be provided with one camera.

According to one example embodiment, the tool carrier comprises a strap.

For example, such a strap enables the tool carrier to be pulled out of the piping.

The case being, the tool carrier can have the wheels free, i.e. disengaged to ease pulling back of the tool carrier.

For example, the strap is fix to the support frame, for example at an end of the support frame named rear end.

According to one example embodiment, the strap comprises at least a string configured to pull the tool carrier out of the piping.

According to one example embodiment, the strap comprises an electrical connection element.

The electrical connection element is configured to supply electrical power to at least the support frame.

For example, the electrical connection element comprises a wire.

According to one example embodiment, the strap comprises a fluidic connection element.

The fluidic connection element is configured to supply fluid at least to the support frame, for example to the actuator.

For example, the fluidic connection element comprises a duct.

Such a tool carrier is also able to pass an elbow between two successive pipes of a piping.

When two successive pipes are aligned or straight, they form an angle $\alpha$ between them of 180°.

The elbow can provide an angle between the two successive pipes which is less than 180°, for example equal to or less than 135° C., equal to or less than 90°, or even equal to or less than 70°, or even equal to or less than 50°, for example about 45°.

For a U-turn, the angle is thus considered to be 0° C.

In parallel, the internal radius of curvature of the elbow can be taken in consideration, compared to dimensions of the tool carrier. Interesting dimensions of the tool carrier are, for example, a distance "e" between the two wheels of one driving module (said distance "e" being also called "wheelbase"), and a depth "h" between a plane tangent to both wheels and any element of the tool carrier between both wheels.

Such a tool carrier can be made to work in piping, a diameter of which can be as desired, or even equal or less than 20 inches, or even 16 inches, for example comprised between 10 inches and 16 inches.

According to one example embodiment, the tool carrier has a traction power of at least 300 N, for example at least 350 N.

Owing to the motor power, the transmission to the wheels, and the wheel grip on the surface, the tool carrier can have a satisfying traction power.

The invention also relates to a tool carrier train, the tool carrier train comprising at least two tool carriers, at least one of the two tool carriers being as described above.

According to one example embodiment, the tool carrier train further comprises at least one tool which is arranged between the two tool carriers.

BRIEF DESCRIPTION OF THE DRAWINGS

Additional features and advantages of the present invention are described in, and will be apparent from, the description of specific embodiments which are set out below with reference to the drawings in which:

FIG. 12 shows a detail of FIG. 10;

FIG. 13 shows a detail of FIG. 11;

FIG. 14 shows the tool carrier according to one example embodiment in an elbow of piping;

FIG. 15 shows a tool carrier train according to a first example embodiment;

DETAILED DESCRIPTION OF THE INVENTION

Figure 1:
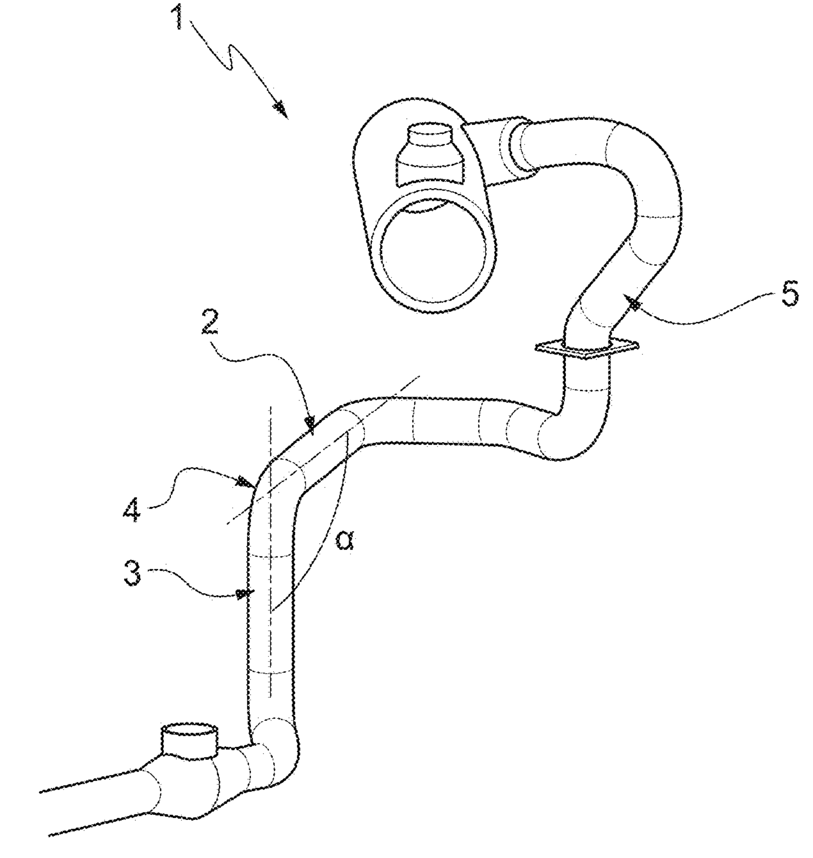
FIG. 1 diagrammatically shows a piping comprising pipes forming elbows between two successive pipes.

As illustrated by FIG. 1, a plant generally comprises a piping 1.

A piping is usually made of several pipes 2, 3, and two successive pipes 2, 3 can form an elbow 4 between them.

When two successive pipes are aligned or straight, they form an angle α between them which is equal to 180°.

Otherwise, an elbow can provide an angle α which is less than 180°.

For a U-turn, with both pipes parallel to each other and connected one to each other, the angle would be considered to be 0° C.

For example, the angle α between two successive pipes 2, 3 shown in FIG. 1 is about 90°, owing to the elbow 4 between them.

In addition, the internal radius of curvature of the elbow can be taken in consideration, as well as a diameter or transversal dimension of the pipe.

Thus, angle α can be very small, and the elbow can be very tight.

Such a piping needs to be kept in good condition in order to comply with safety requirement or reduce plant downtime.

To this end, it is often desired to examine and/or repair the piping.

Thus, a tool carrier may have to be introduced in the piping, for inspection of at least a part of it, and/or perform any work which may be necessary.

However, such a piping can comprise pipes of various diameter, of various length, and/or of any inclination (horizontal, vertical, or of any slope).

For example, in FIG. 1, pipe 3 is vertical, pipe 2 is horizontal, and a pipe 5 is tilted of about 45° relative to a horizontal layout.

Besides, it may be necessary that the tool carrier could be able to move forward or backward, and/or to pass an elbow between two successive pipes.

Figure 2:
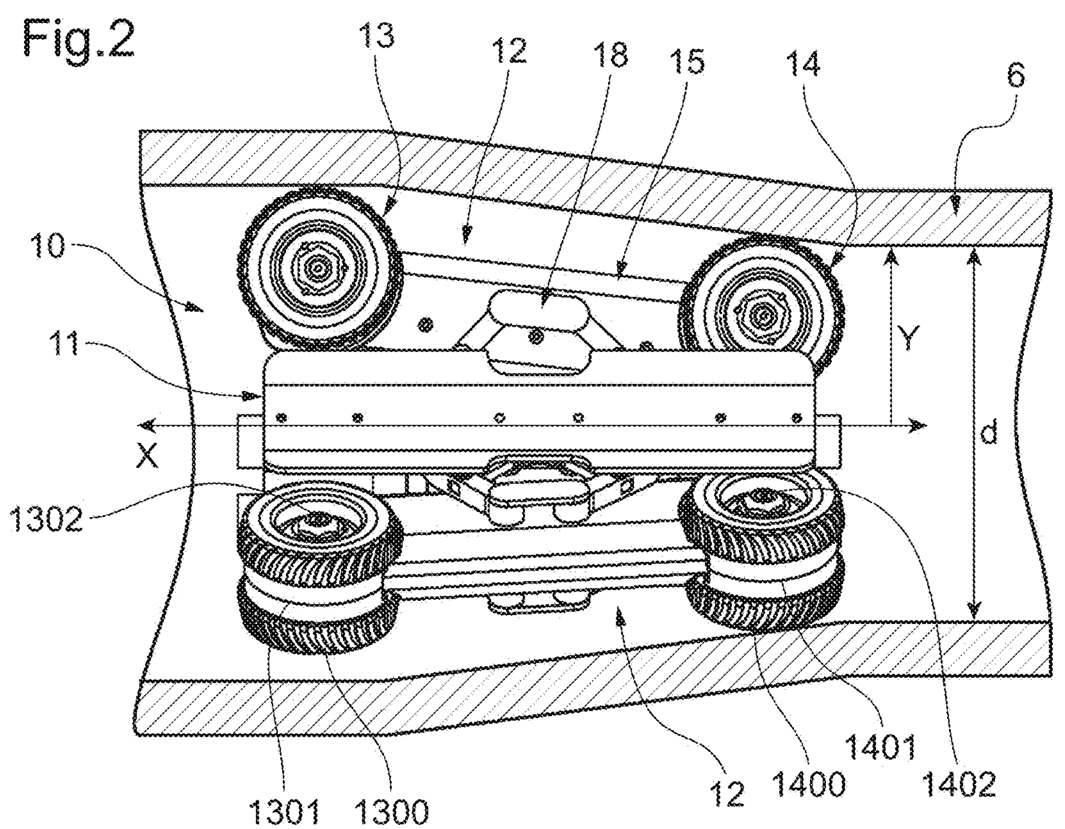
FIG. 2 shows a tool carrier according to a first example embodiment in a pipe.

In this context, FIG. 2 shows a tool carrier 10 according to one example embodiment of the invention.

In FIG. 2, the tool carrier 10 is shown in a pipe 6 of a variable diameter "d".

The tool carrier 10 comprises a support frame 11.

The support frame 11 is a central part of the tool carrier.

In the illustrated embodiment, the tool carrier 10 comprises at least one driving module 12.

The driving module is configured to move the support frame 11, and so the tool carrier, along a direction, named driving direction "X".

Here, the tool carrier 10 comprises three driving modules 12.

In the illustrated embodiment, the three driving modules 12 are arranged regularly around the support frame 11.

Thus, the three driving modules 12 are arranged at about 120° relative to one another abound the support frame.

Besides, in the illustrated embodiment, the three driving modules 12 are identical.

As a consequence, only one driving module 12 is here described in details.

The driving module 12 here comprises two wheels 13, 14: one of the two wheels is named front wheel 13, and another of the two wheels is named rear wheel 14.

However, "front" and "rear" is here arbitrary and both words may be switched. For easy reading of the drawings, the front wheel 13 is generally drawn on a left hand side of a figure, while the rear wheel 14 is generally drawn on a right hand side of a figure. But, as described below, the tool carrier can move back and forth along the driving direction X.

Here, the front wheel 13 comprises a frame part 1301 and at least one sub-wheel 1300.

The at least one sub-wheel 1300 is configured to pivot on the frame-part 1301.

To this end, the frame part 1301 comprises a hub 1302 about which the sub-wheel 1300 can pivot.

Same, the rear wheel 14 comprises a frame part 1401 and at least one sub-wheel 1400 which is about to pivot about an hub 1402 of the frame part 1401.

In addition, each of the front and rear wheels is here a double-wheel, as visible in the figures.

Thus, each of the front wheel 13 and the rear wheel 14 here comprises two sub-wheels 1300, 1400 making the double-wheel.

So, in the present example, the frame part 1301 is between the two sub-wheels 1300 of the front wheel 13.

And similarly, the frame part 1401 is between two sub-wheels 1400 of the rear wheel 14.

According to the illustrated example embodiment, the front wheel 13 and the rear wheel 14 are aligned one behind the other along the driving direction X.

Figure 11:
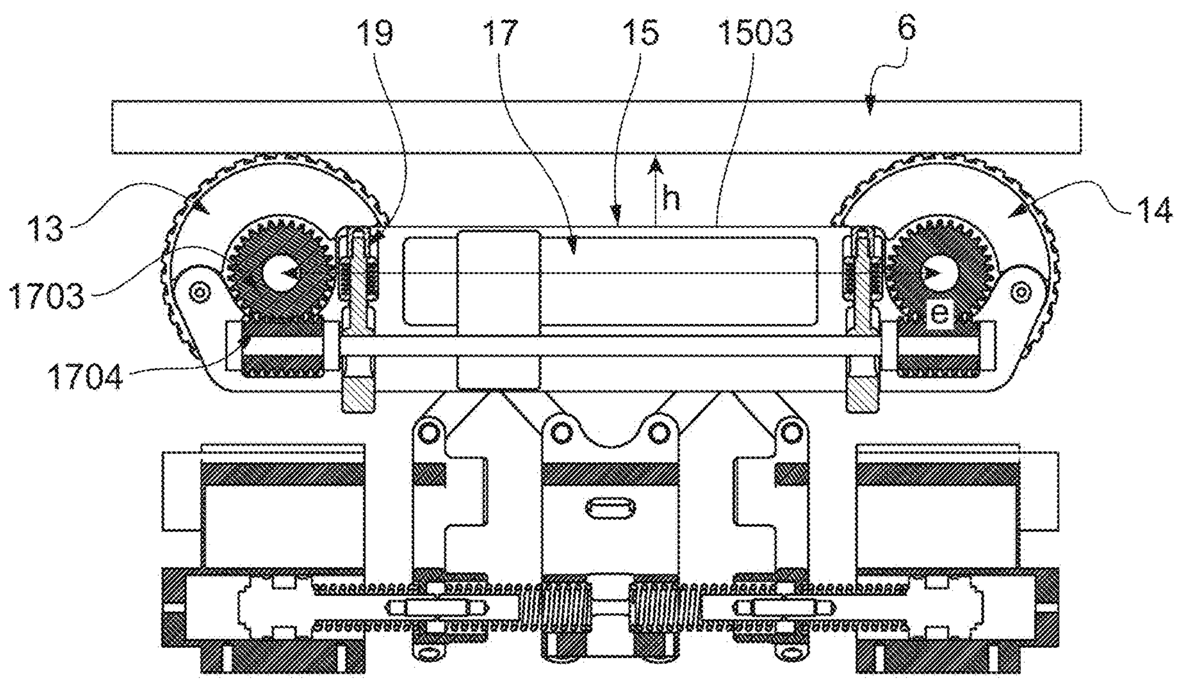
FIG. 11 shows the view of FIG. 10 with the wheels being engaged.

As illustrated in FIG. 11, the two wheels 13, 14 are distant one from the other, along direction X, of a distance "e", also called "wheelbase".

Thus, the front wheel and the rear wheel are mounted on the support frame 11 and configured to move the support frame along the driving direction X.

In the example embodiment shown in FIGS. 2 to 11, the driving module 12 also comprises a bogie 15.

A bogie here designates a framework that carries the wheels 13, 14.

Thus, the front wheel 13 and the rear wheel 14 are mounted on the bogie 15.

As illustrated in FIG. 11, an upper surface 1503 of the bogie 15 (or any element between the wheels if there is no bogie) and a plane tangent to both wheels 13, 14 define a depth "h".

In combination with the wheelbase "e", this depth "h" allows the tool carrier the pass elbows of appropriate internal curvature radius.

In this illustrated embodiment, the bogie is even situated between the sub-wheels of the double-wheel of each of the front and rear wheels.

As visible in the figures, the bogie has a simple form and structure, for example of a cylindrical type, a section of which can be of any shape. Here the section is of a rectangular shape, but is could be round or any other.

The bogie 15 is mounted on the support frame 11, in particular owing to at least one deployment system 16 described below in connection with FIGS. 8 and 9.

Figure 3:
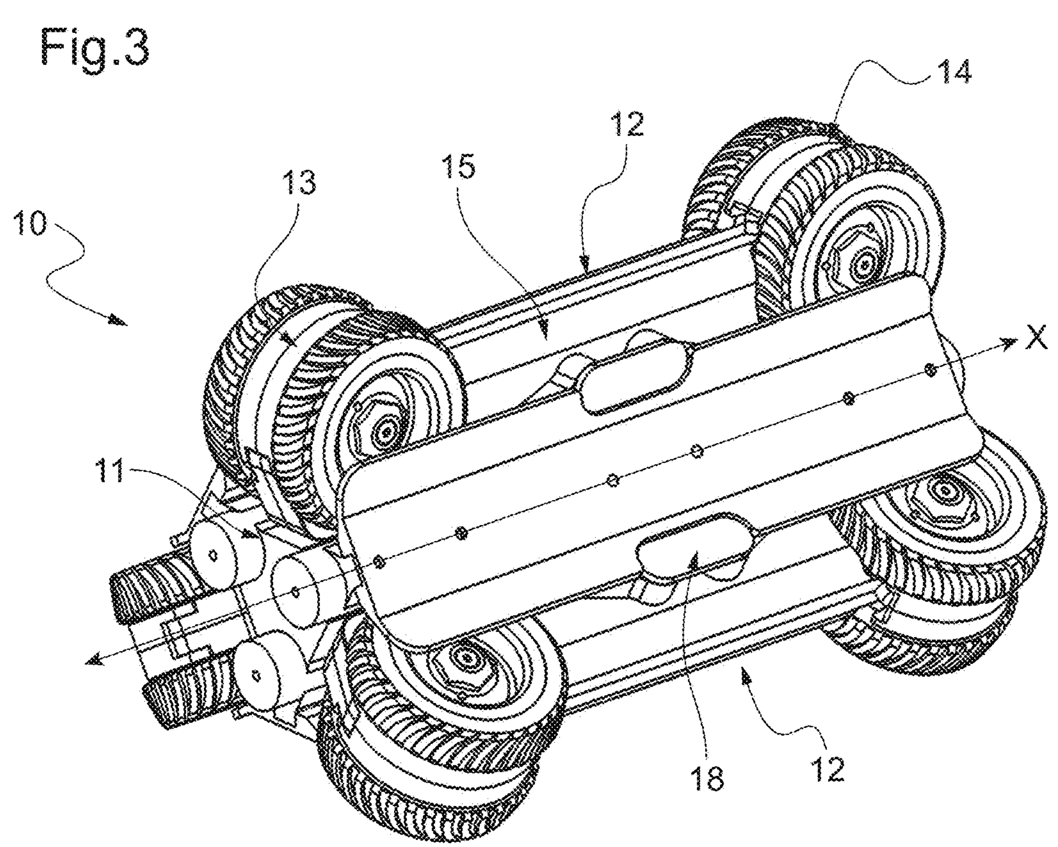
FIG. 3 shows the tool carrier of FIG. 2 in a closed configuration according to one example embodiment.
Figure 4:
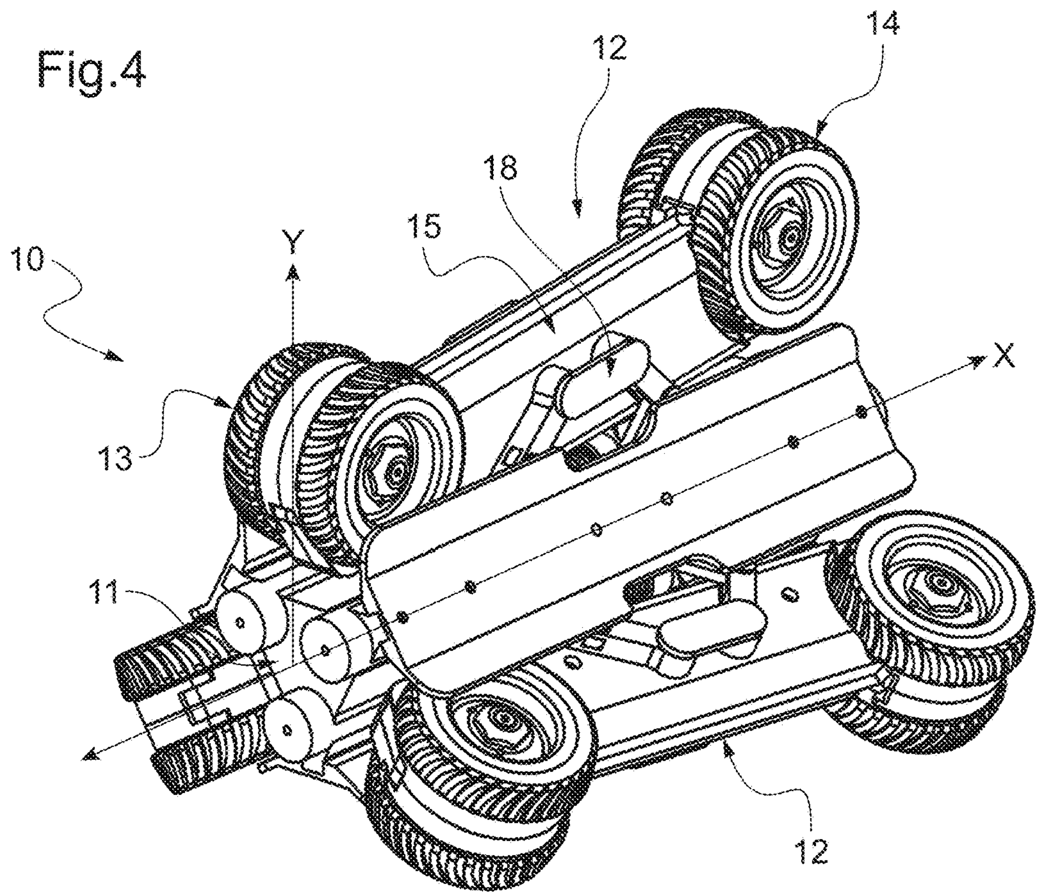
FIG. 4 shows the tool carrier of FIG. 2 in an intermediate configuration according to one example embodiment.
Figure 5:
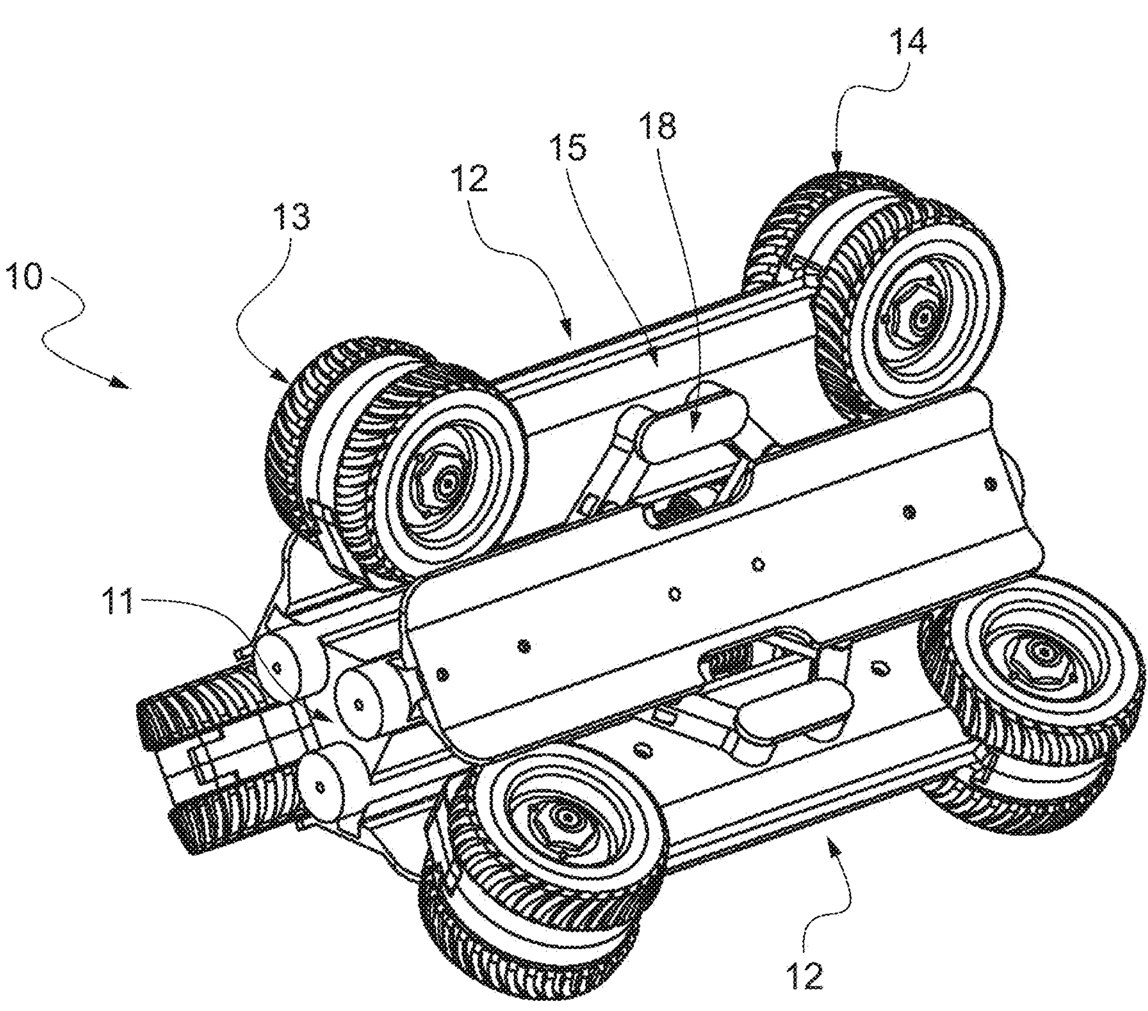
FIG. 5 shows the tool carrier of FIG. 2 in an expanded configuration according to one example embodiment.

As illustrated by FIGS. 3, 4 and 5, each of the wheels 13, 14 is movable between a retracted position (like in FIG. 2), in which the wheel is at a first distance relative to the support frame 11, and a deployed position (like in FIG. 5), in which the wheel is further from the support frame 11 than in the retracted position, i.e. at a greater distance than the first distance relative to the support frame. The wheel thus moves according to a radial direction "Y" (illustrated FIG. 2), which is orthogonal to the driving direction X.

In other words, the wheel in the deployed position is taken away from the support frame 11, compared to the retracted position.

For example, the wheel can take any intermediate position between the retracted position and the deployed position.

The tool carrier then has at least a configuration, named closed configuration (like in FIG. 2), here in which both wheels 13, 14 are in the retracted position, and another configuration, named expanded configuration, in which, here, both wheels are in the deployed position (like in FIG. 5).

Then, the tool carrier can take any intermediate configuration between the closed configuration and the expanded configuration, depending on the position of each of the wheels.

Here for example, in FIG. 4, the front wheel 13 is in retracted position while the rear wheel 14 is in deployed position.

Figure 6:
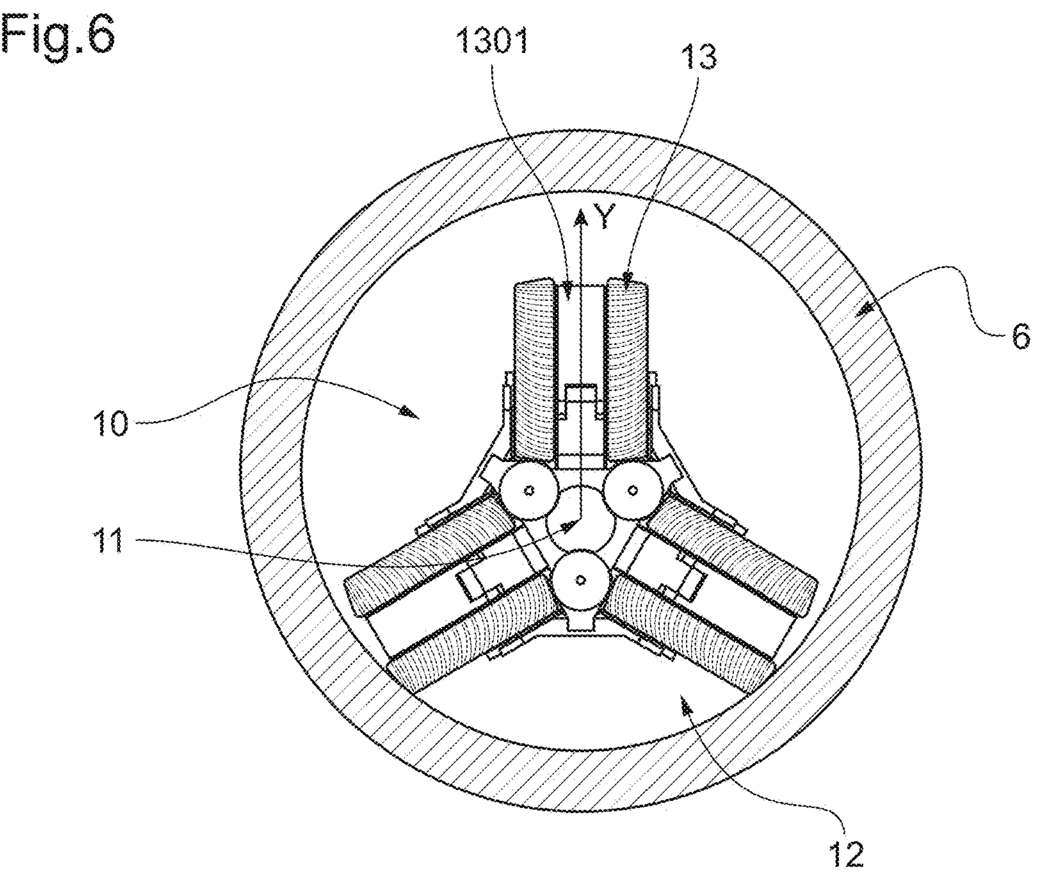
FIG. 6 shows the tool carrier in closed configuration in a pipe according to one example embodiment.
Figure 7:
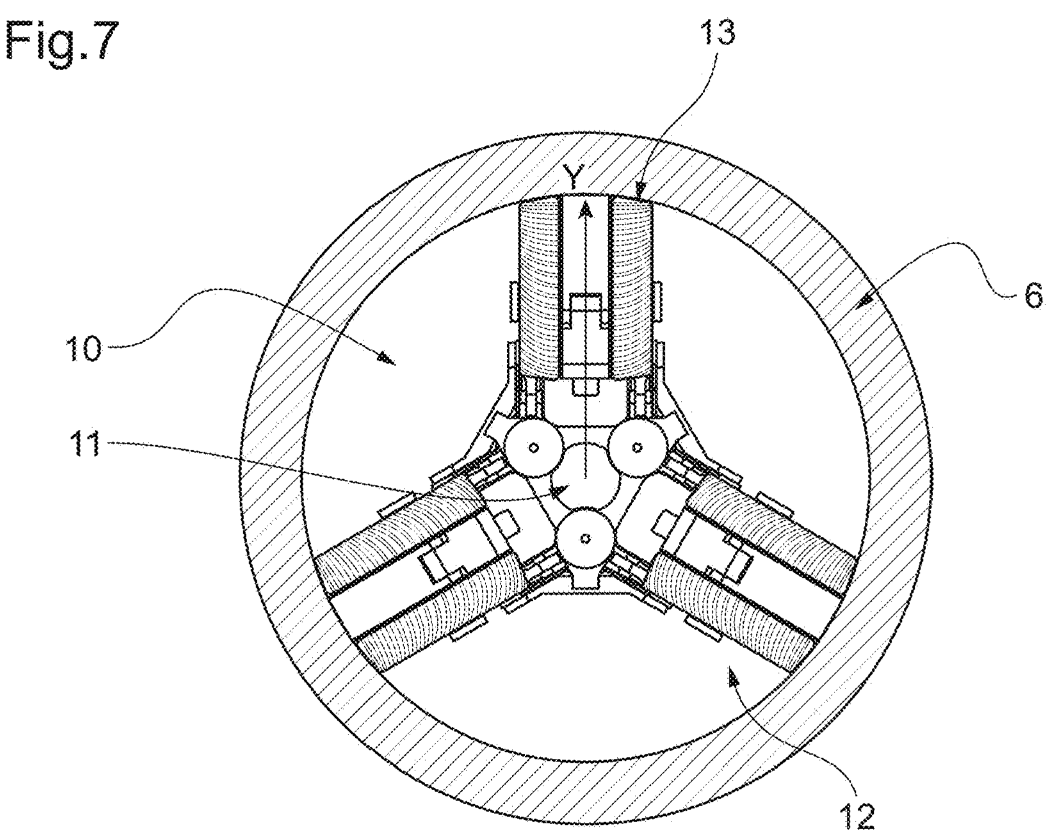
FIG. 7 shows the tool carrier in expanded configuration in the pipe of FIG. 6 according to one example embodiment.

Such a tool carrier can thus be relatively compact, while it can expand and therefore adapt to dimensions of a pipe in which it is inserted, like illustrated in FIGS. 6 and 7.

For example, in FIG. 6, the tool carrier in closed configuration has a smaller radial dimension than a radius of the pipe; while in FIG. 7, the tool carrier in expanded configuration has a radial dimension equal to the radius of the pipe, so that the wheels can roll on an internal surface of the pipe.

Figure 8:
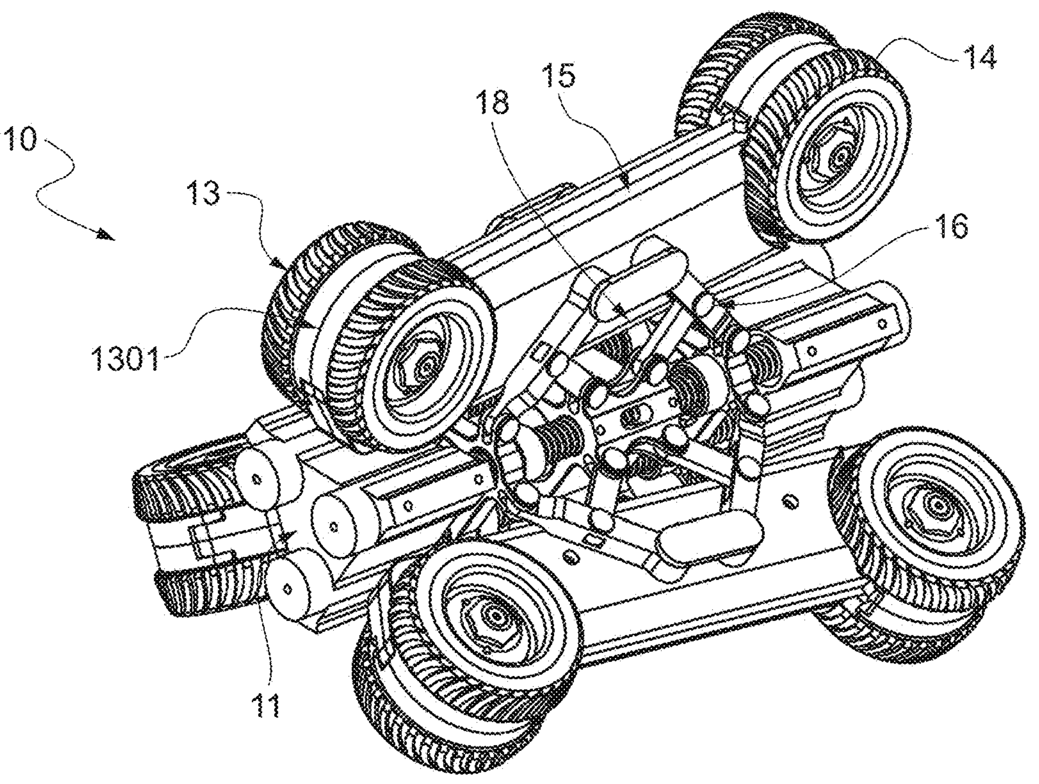
FIG. 8 is a perspective view of the tool carrier in intermediate configuration with a part off to show a deployment system of the tool carrier according to one example embodiment.
Figure 9:
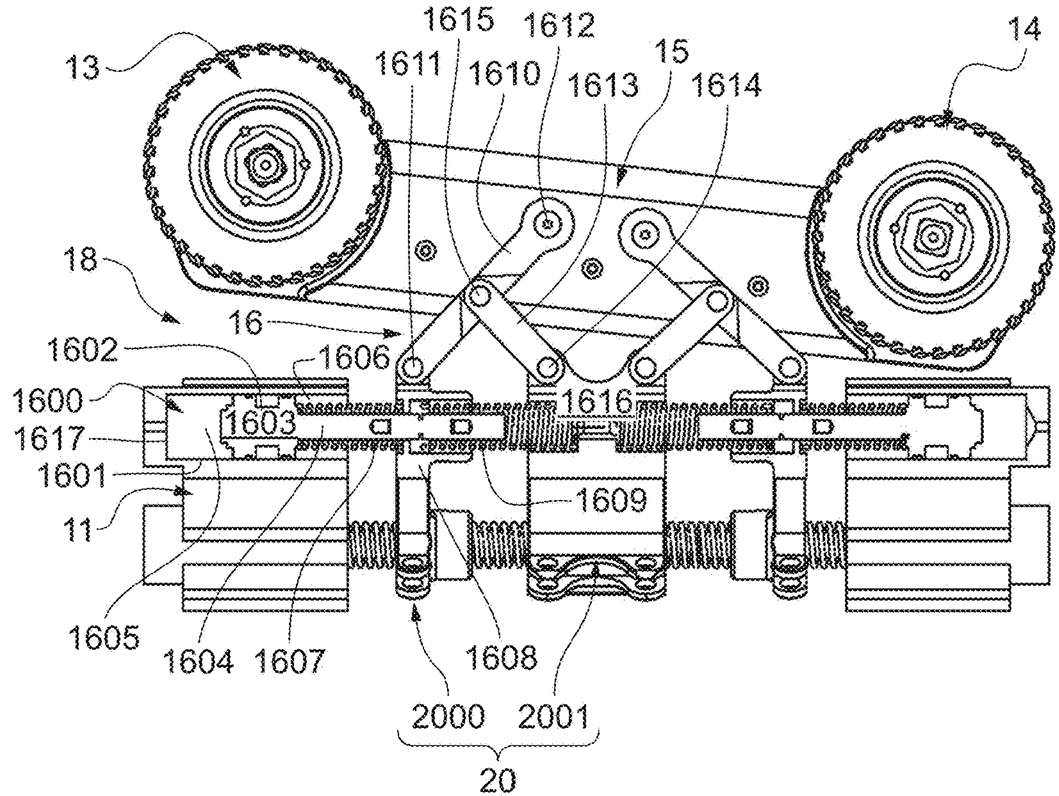
FIG. 9 is a partial side view of the tool carrier according to the first example embodiment.

To this end, the driving module 12 comprises a deployment system 16, which is better shown in FIGS. 8 and 9.

The deployment system 16 is configured to move radially at least one wheel among the front wheel 13 and the rear wheel 14 between the retracted position and the deployed position, compared to the support frame 11.

Here, the tool carrier even comprises a deployment system which is configured to move radially the front wheel, here named front deployment system, as well as another deployment system which is here configured to move radially the rear wheel, and is here named rear deployment system.

Thus, each of the front wheel 13 and the rear wheel 14 can move independently between the retracted position and the deployed position.

As they are identical, only one deployment system, for example the front deployment system, is described in details here below.

For convenience, each part of the front deployment system can also be qualified "front" part.

As illustrated in FIG. 9, the deployment system 16 here comprises at least one actuator; here the actuator is a hydraulic or pneumatic cylinder 1600.

The hydraulic or pneumatic cylinder gets power from a fluid under pressure.

For example, the fluid is air, oil or water.

The hydraulic or pneumatic cylinder 1600 comprises a cylinder barrel 1601, and a piston 1602 comprising a piston head 1603 and a piston rod 1604 which is connected to the piston head 1603. The piston head 1603 is configured to move back and forth in the cylinder barrel 1601. Thus, the piston head divides an internal volume of the cylinder barrel 1601 into two chambers 1605, 1606: a first of the two chambers 165 receives some fluid, and the other of the two chambers 166 surrounds the piston rod 1604.

Here, the support frame 11 comprises the cylinder barrel 1601.

The deployment system 16 further comprises a first spring 1607 configured to push the piston head 1603 and pressurize the fluid when it is in the first chamber 1605.

The deployment system 16 further comprises here a sliding part 1608.

The sliding part 1608 is axially fixed to the piston rod 1604.

This means a link between the sliding part and the piston is a fixed link in translation so that any translational movement of the piston leads a movement of the sliding part along a same direction but the sliding part can not slide along the piston rod. But, the sliding part can pivot in relation to the piston, or be fix in rotation too.

The deployment system 16 further comprises a second spring 1609, so that the sliding part 1608 is maintained between the first spring 1607 and the second spring 1609.

In addition, here, the first spring is placed between the piston head and the sliding part, while the second spring is place between the sliding part and an anchoring part 1616, described later.

Then, the deployment system 16 further comprises here a main connecting rod 1610.

The main connecting 1610 rod is connected at one end to the sliding part 1608 by a pivot connection 1611, and at another end to the bogie 15 by a pivot connection 1612.

Here, the deployment system 16 further comprises the anchoring part 1616 which is fixed, immobilized, in relation to the support frame 11.

The deployment system 16 further comprises a secondary connecting rod 1613, and the secondary connecting rod 1613 is connected at one end to the anchoring part 1616 by a pivot connection 1614, and at another end to the main connecting rod 1610 by a pivot connection 1615.

Thus, when no fluid, or some fluid with insufficient pressure, is in the first chamber 1605, the piston head 1603 is at a bottom 1617 of the cylinder barrel 1601.

When moving toward the bottom 1617, the piston draws the sliding part 1608, and the pivot connections of the two rods 1610, 1613 pull the front wheel 13 down in retracted position.

When fluid under pressure is injected in the first chamber 1605, the piston head 1603 is pushed far from the bottom 1617 of the cylinder barrel 1601, toward an axial center of the support frame 11.

The piston then pushes the sliding part 1608 to the axial center, and the pivot connections of the two rods 1610, 1613 push the front wheel 13 up in the deployed position.

Same applies to the rear wheel 14.

However, as shown in the figures, the rear deployment system is arranged in mirror compared to the front deployment system.

For convenience, each part of the rear deployment system can be qualified "rear" part.

However, the anchoring part 1616 for the rear deployment system is here the same part as for the front deployment system.

Further, in the illustrated example embodiment, the support frame 11 comprises a front synchronization mechanism 20 configured to synchronize the front deployment systems of all the driving modules.

Then, all the front wheels of one tool carrier can move between a deployed position of a retraced position together, in a same way, so that the support frame remains central compared to the tool carrier.

Similarly, the support frame 11 comprises a rear synchronization mechanism configured to synchronize the rear deployment systems of all the driving modules, so all the rear wheels of one tool carrier can move between a deployed position of a retraced position together, in a same way, so that the support frame remains central compared to the tool carrier.

As they are identical, only the front synchronization mechanism 20 is described in details here below.

However, same applies to the rear synchronization mechanism which is also, as shown in the figures, arranged in mirror compared to the front synchronization mechanism 20.

In the specific embodiment illustrated here, for example in FIG. 9, the front synchronization mechanism 20 comprises a sliding member 2000.

The sliding member 2000 comprises the sliding part 1608 of all the driving modules 12 of the tool carrier.

As a consequence, when fluid is injected in the cylinder 1600 of the front deployment system of at least one of the driving modules, a move of at least one piston 1602 leads to a move of the sliding member 2000.

This further ensures that the front wheels move all together at a same time while the support frame 11 remains central in the tool carrier, as visible in FIGS. 6 and 7.

In practice, fluid is injected in the cylinder 1600 of the front deployment system of each of the driving modules for a better distribution of pressures.

Similarly, the front synchronization mechanism 20 also comprises an anchoring member 2001.

The anchoring member 2001 comprises the anchoring part 1616 of the deployment system 16 of each of all the driving modules 12 of the tool carrier.

Thus, in the present embodiment, the support frame 11 comprises the anchoring member 2001.

Although the anchoring member is therefore common to the front deployment system and the rear deployment system, the front deployment system and the rear deployment system can be actuated independently.

As a consequence, only the front wheels can be placed in a deployed position, or any intermediate position, while the rear wheels are in retracted position, or conversely; or all the wheels can be place in deployed position, or retracted position.

In the illustrated embodiment, the driving module 12 also comprises a tilting system 18 configured to tilt the bogie 15 relative to the support frame 11, which is better shown in FIGS. 8 and 9.

The tilting system designates a system which is configured to move and tilt the bogie relative to the support frame, in particular compared to the radial direction Y.

Thus, at least one wheel among the front wheel 13 and the rear wheel 14 can move between the retracted position and the deployed position while moving the bogie 15 compared to the support frame.

For example, the front wheel can be in its retracted position while the rear wheel can be in its deployed position, owing to a tilt of the bogie.

Thanks to a tilting bogie, the tool carrier can move within a conical pipe.

Here, the tilting system 18 comprises the front deployment system and the rear deployment system, with the rear deployment system being in mirror compared to the front deployment system.

Figure 10:
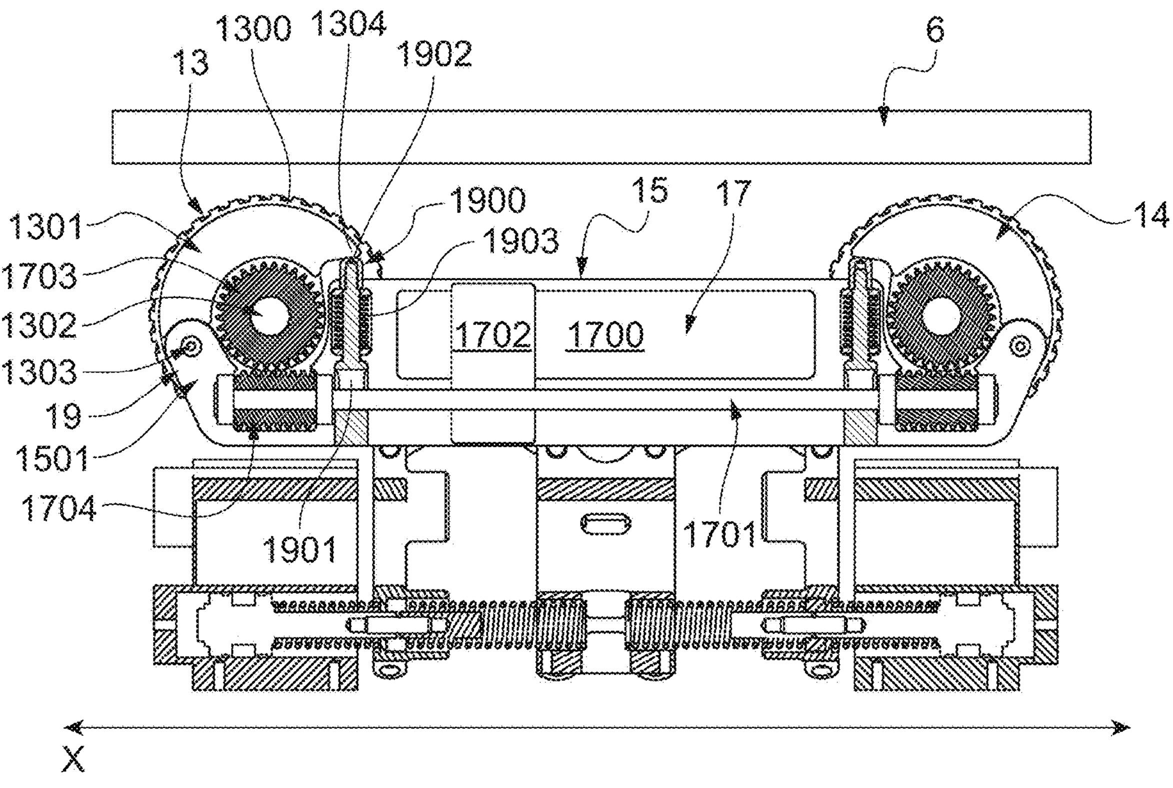
FIG. 10 is a partial side view of the tool carrier according to the first example embodiment showing the engaging system, the wheels being disengaged.

FIGS. 10 and 11 show a section view of one driving module 12 accord to the example embodiment of FIGS. 3 to 9.

This figures show that the driving module 12 comprises a motor assembly 17.

The motor assembly 17 is here configured to drive at least one wheel among the front wheel 13 and the rear wheel 14, and for example here both the front wheel 13 and the rear wheel 14.

Thus, the two wheels 13, 14 of one driving module 12 are synchronized, i.e. they are configured to turn together, at a same speed.

Here, the motor assembly 17 comprises a dual direction motor 1700, so that it can drive the wheels according to a first direction, and according to a second direction, opposite to the first direction, and both along direction X.

The tool carrier can thus move forward and backward in a pipe 6.

In the illustrated embodiment, the motor 1700 is located in the bogie 15.

In addition, the motor assembly 17 comprises a driving shaft 1701.

The driving shaft 1701 is rotated by the motor 1700.

In the present embodiment, the motor assembly 17 also comprises gears 1702 between the motor 1700 and the driving shaft 1701.

At each end, the driving shaft 1701 is configured to rotate one of the front wheel 13 or the rear wheel 14, or both, owing to an engaging system 19.

When one wheel 13, 14 is engaged, i.e., clutched or interlocked, on the driving shaft 1701, it is driven in rotation by the motor 1700.

When one wheel 13, 14 is not engaged, i.e. disengaged (unclutched from or no longer interlocked on the driving shaft 1701), then said wheel is free.

To this end, the driving module 12 comprises a worm and worm wheel system. For example, on one hand, the driving shaft 1701 comprises a front end provided with a front worm screw 1704, joined together. Similarly, the driving shaft 1701 here comprises a rear end provided with a rear worm screw. On another hand, the front wheel 13 (resp. the rear wheel 14) is provided with a front gearwheel 1703 (resp. a rear gearwheel), joined together.

When the wheel is engaged, the gearwheel meshes with the worm screw, so that the wheel 13, 14 is rotated by the driving shaft 1701.

To engage or disengage the wheel to the motor assembly 17, in particular with the driving shaft 1701, the driving module 12 comprises an engaging system 19 which is configured to engage or disengage at least one wheel among the front wheel 13 and the rear wheel 14, for example, at least the wheel which is driven by the motor assembly.

In the present embodiment, the driving module 12 even comprises a front engaging system 19 configured to engage or disengage the front wheel 13, and a rear engaging system configured to engage or disengage the rear wheel 14, so that each of the front wheel and the rear wheel can be engaged or disengaged independently one from the other.

Same as before, the rear engaging system is identical to the front engaging system 19, but as visible in FIGS. 10 and 11, they are arranged in mirror.

Thus, only the front engaging system 19 is described here; but same applies to the rear engaging system, corresponding elements being named "front" and "rear" if necessary.

To connect the front wheel 13, the bogie 15 comprises a front cantilever arm 1501, to which the frame part 1301 of the front wheel 13 is connected by a pivot connection 1303.

As visible in FIGS. 10 and 11, the pivot connection 1303 is off-center compared to the hub 1302.

Owing to this, in this embodiment of the figures, when the front wheel 13 rotates about the pivot connection 1303 in a first way, for example clockwise in FIG. 10, the gearwheel 1703 meshes with the worm screw 1704. When the front wheel 13 rotates about the pivot connection 1303 in a second way, opposite the first way, for example counterclockwise in FIG. 10, the gearwheel 1703 separates from the worm screw 1704, and so the wheel is free.

Whatever the situation is, the sub-wheel 1300 can still turn about the hub 1302.

In a rest configuration of the tool carrier, the wheel 13 is here free.

To this end, the front engaging system 19 comprises a pushing finger 1900.

The pushing finger 1900 is mounted on the bogie 15 and pushes the wheel back so that the gearwheel 1703 is separated from the worm screw 1704, and so the wheel is free.

The pushing finger 1900 comprises a root 1901, which is fixed to the bogie 15, and a tip 1902 which rests against a stop 1304 of the frame part 1301 of the wheel. The pushing finger 1900 also comprises here a spring 1903 configured to push the tip 1902 far from the root 1901.

As illustrated in FIG. 11, when the front wheel 13 is brought against a wall of the pipe 6, for example when the front wheel 13 is in deployed position, the front wheel is then pushed by the wall by a corresponding force F (represented FIG. 13) which shall be greater than the corresponding force of the spring 1903. In the present embodiment, pushing on the wall makes the front wheel rotate the first way, and then the gearwheel 1703 meshes with the worm screw 1704.

Figures 12, 13, 14, 15:
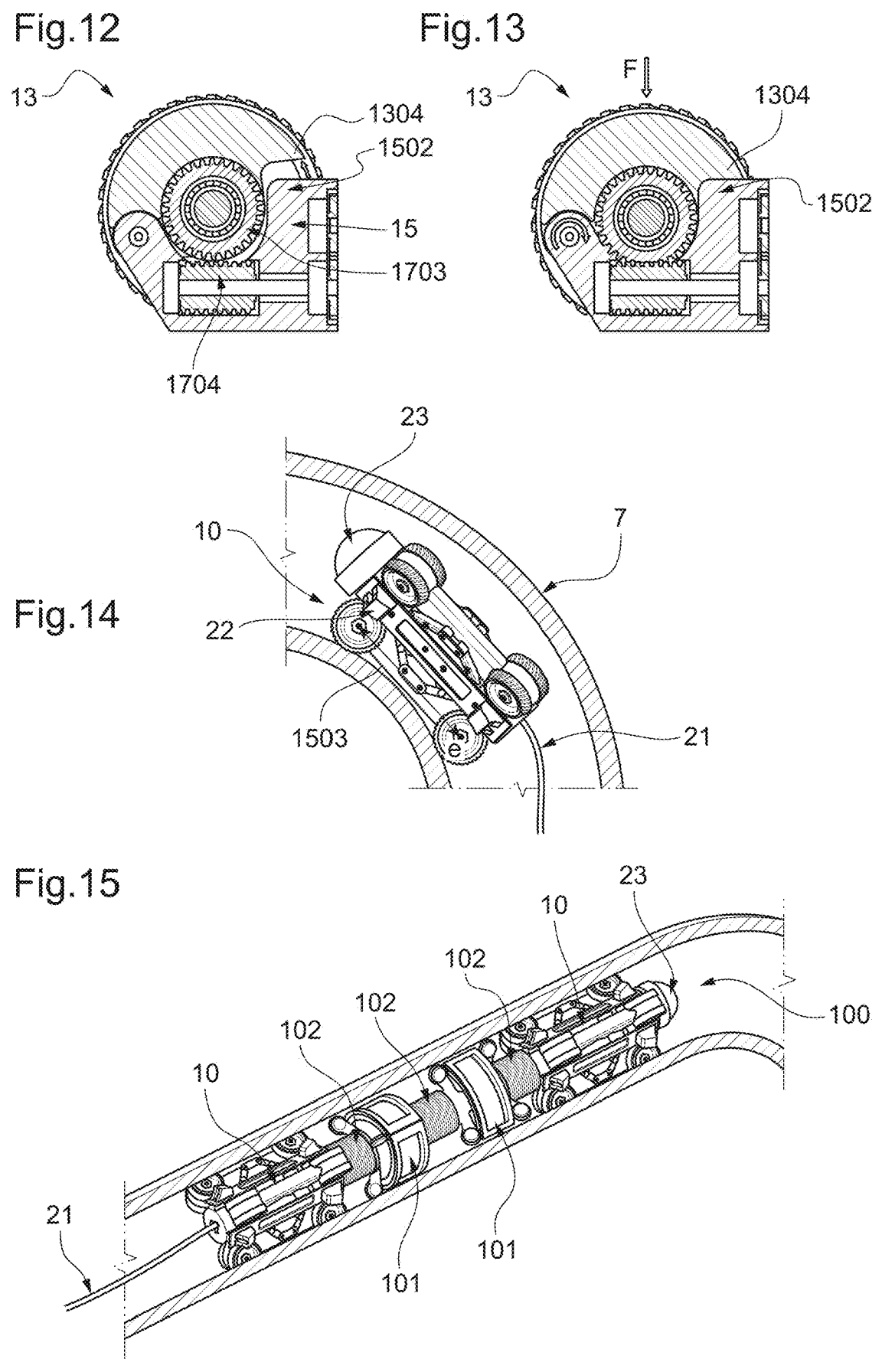

FIG. 12 shows in more details the disengaged position of the front wheel 13, and FIG. 13 shows in more details the engaged position of the front wheel 13.

These figures better show that the bogie 15 further comprises a stop edge 1502 configured to abut the stop 1304 when the wheel is pushed by a force F to engage.

This allows preventing a grinding or a crushing of the gearwheel 1703 and the worm screw 1704.

FIG. 14 shows the tool carrier 10 according to one example embodiment in an elbow 7 of a piping.

This figure illustrates that a sizing of the tool carrier 10 for intervening in a given piping depends on the internal radius of curvature of the elbow 4. Interesting dimensions of the tool carrier 10 are, for example, the wheelbase "e" between the two wheels 13, 14 of one driving module, and the depth "h" between a plane tangent to both wheels and any element of the tool carrier 10 between both wheels, here an upper surface 1503 of the bogie 15.

FIG. 14 also shows that the tool carrier can comprises a strap 21.

The strap 21 is fix to the support frame 11, at a rear end of the support frame 11.

Such a strap enables the tool carrier to be pulled out of the piping. The case being, the tool carrier 10 can have the wheels free, i.e. disengaged to ease pulling back of the tool carrier.

The strap 21 comprises at least a string configured to pull the tool carrier 10 out of the piping.

Although not visible here, the strap 21 comprises an electrical connection element, which is for example configured to supply electrical power to at least the support frame, and here even to the bogie 15 which includes the motor assembly 17.

The strap 21 also comprises a fluidic connection element which is here configured to supply the fluid, possibly under pressure, at least in the support frame, for example to the hydraulic or pneumatic cylinder.

The tool carrier 10 can also comprise at least one tool compartment 22.

For example, the tool compartment can be provided with a tool.

For example, the tool can comprise, a mechanical tool for machining, milling, grinding, levelling and flapping; a NDT (non-destructive testing) inspection tool, for example for visual inspection, ultrasonic testing (UT), eddy current testing (ET), dimensional, profilometry or 3D scanner, moulding; a grabbing tool, for example a gripping tool (plier, hook, suction, or even a vacuum system), or other as desired.

Figure 17:
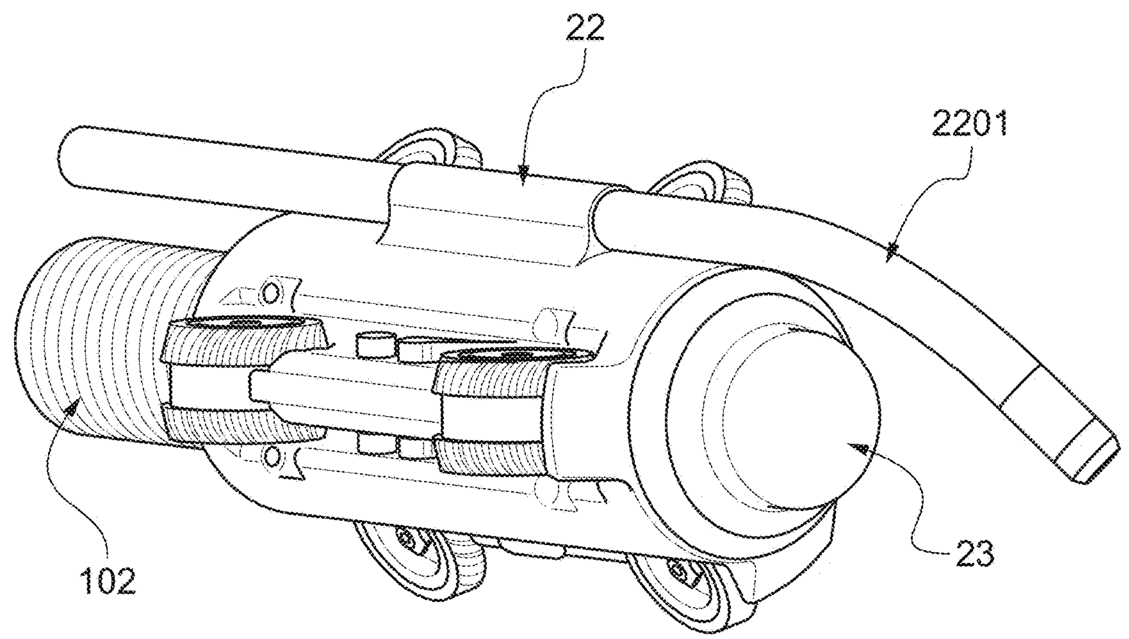
FIG. 17 shows a tool carrier according to a second example embodiment carrying a tool.

A tool compartment 22 is also shown in FIG. 17 according to another example embodiment.

For example, the tool compartment 22 of either FIG. 14 or FIG. 17 is configured to receive a hose 2201.

In the illustrated embodiment of FIG. 14, the tool carrier 10 also comprises at least one camera compartment 23 arranged at a front end of the support frame 11, the front end being opposite to the rear end to which is here connected the strap 21.

FIG. 15 shows a tool carrier train according to a first example embodiment.

The tool carrier train 100 comprises at least two tool carriers 10, at least one of the two tool carriers being as described above. Here, it comprises two identical tool carriers 10.

The tool carrier train further comprises at least one tool compartment 101 which is arranged between the two tool carriers 10.

To enable passing elbows, the tool carrier train 100 further comprises at least one flexible junction 102.

The flexible junction 102 comprises for example a spring, and more specifically a full-wound springs.

Here, it comprises three flexible junctions 102 so that each tool compartment 101 is arrange between two flexible junctions 102, one flexible junction 102 being attached to one end of one tool carrier 10.

Thus, the tool carrier train 100 here comprises in series a first tool carrier 10, a first flexible junction 102, a first tool compartment 101, a second flexible junction 102, a second tool compartment 101, a third flexible junction 102, and a second tool carrier 10. In addition, a camera compartment 23 is arranged at a front end of the support frame o the first tool carrier 10 while the strap 21 is fix to the rear end of the support frame of the second tool carrier 10.

Figure 16:
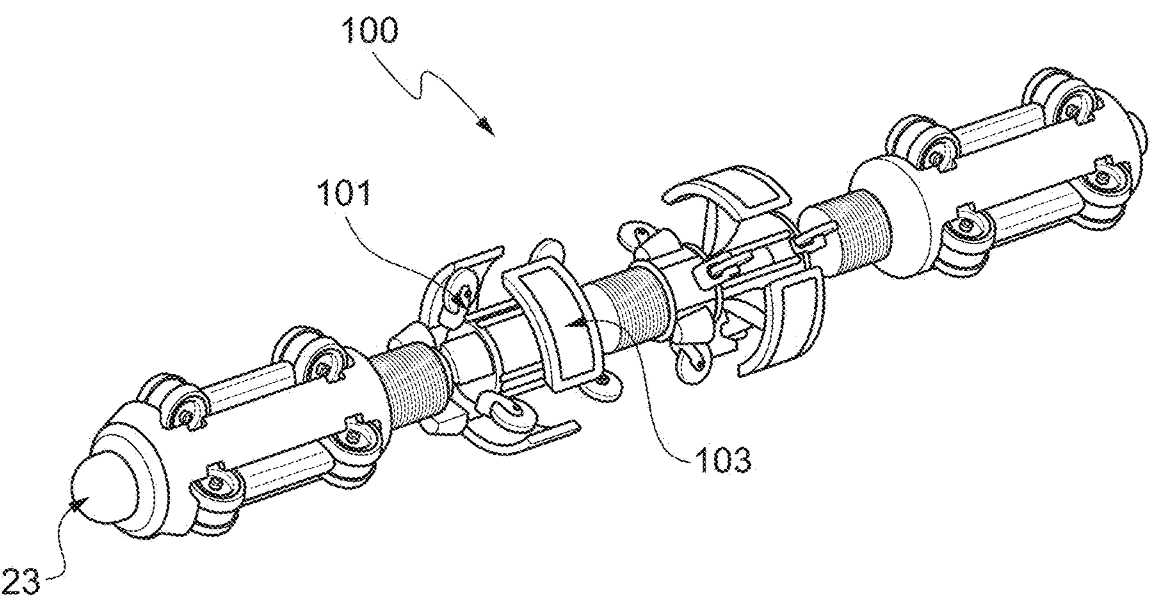
FIG. 16 shows a tool carrier train according to a second example embodiment.

FIG. 16 shows a tool carrier train 100 according to a second example embodiment, the structure of which is similar to the one of the embodiment of FIG. 15. It differs in that it also comprises here covers 103 to protect some parts of the train 100, for example here a tool compartment 101 arranged between two tool carriers 10.

FIG. 17 shows the tool carrier 10 according to a second example embodiment carrying the hose 2201 as a tool.

Figure 18:
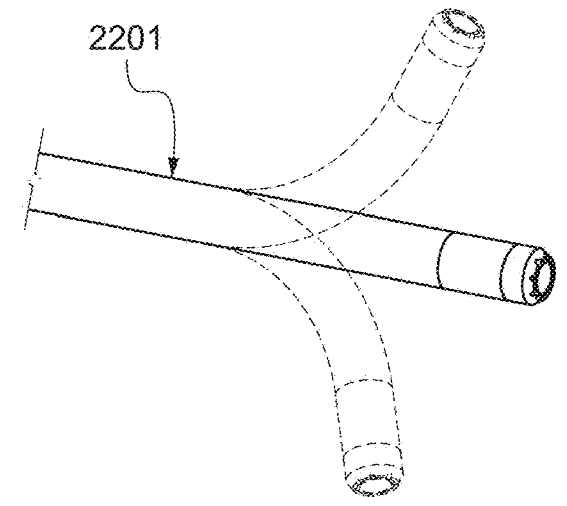
FIG. 18 illustrates the tool of FIG. 17.

As illustrated in FIG. 18, the hose 2201 comprises a foldaway system.

It enabled to fold the tool and keep it in a predetermine position, for example for exploring a particular point in the piping.

Figure 19:
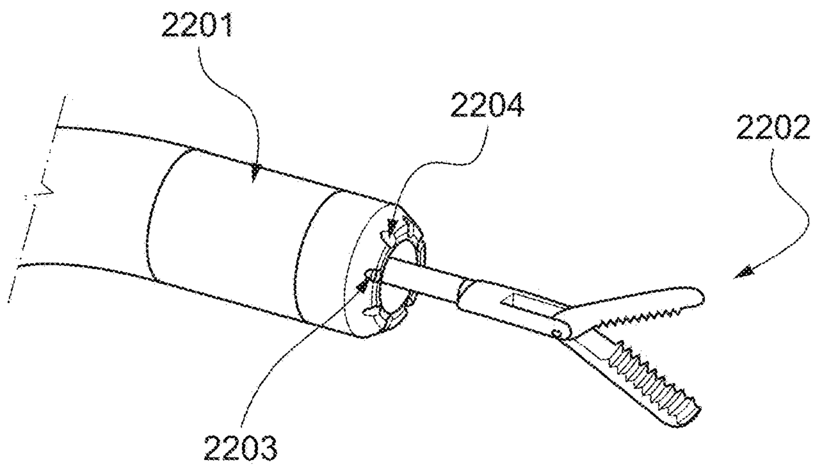
FIG. 19 shows an example embodiment of the tool comprising a clamp.

As illustrated in FIG. 19, the hose 2201 can be provided with a clamp 2202.

The clamp can for example be actuated at a remote end of the hose 2101.

It thus enable to catch an element which could be lost in the piping.

Figure 20:
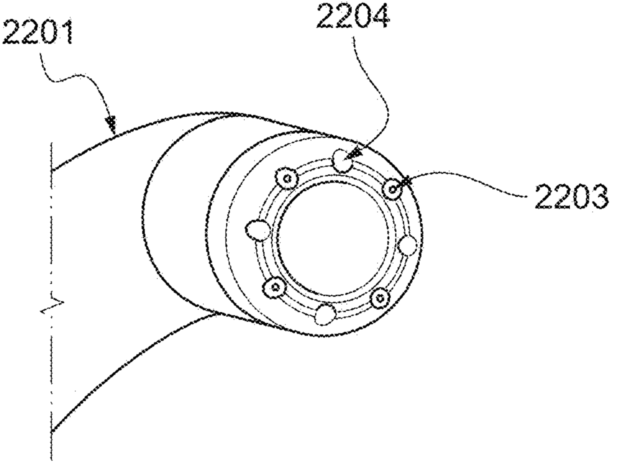
FIG. 20 shows an example embodiment of the tool comprising cameras.

At last, FIG. 20 shows an example embodiment of the hose 2201 comprising cameras 2203 and LEDs 2204.

The invention claimed is:

1. A tool carrier comprising:

a support frame; and at least one driving module-mounted on the support frame, the at least one driving module being configured to move the support frame along a driving direction, the at least one driving module comprising two wheels including a front wheel and a rear wheel, at least one motor assembly which is configured to drive at least one wheel among the front wheel and the rear wheel, and at least one engaging system which is configured to engage the at least one wheel with the motor assembly or disengage the at least one wheel from the motor assembly, wherein the at least one wheel is movable between a retracted position, in which the at least one wheel is at a distance relative to the support frame, and a deployed position, in which the wheel is at a greater distance from the support frame than the distance in the retracted position, according to a radial direction, which is orthogonal to the driving direction.

2. The tool carrier according to claim 1, wherein the tool carrier has at least two configurations including a closed configuration, in which the at least one wheel is in the retracted position, and an expanded configuration, in which the at least one wheel is in the deployed position.

3. The tool carrier according to claim 1, wherein the at least one driving module further comprises at least one deployment system configured to radially move the at least one wheel between the retracted position and the deployed position, compared to the support frame.

4. The tool carrier according to claim 1, wherein the front wheel and the rear wheel are aligned one behind the other along the driving direction.

5. The tool carrier according to claim 1, wherein the at least one driving module comprises at least one bogie mounted on the support frame, the front wheel and the rear wheel being mounted on the at least one bogie.

6. The tool carrier according to claim 5, wherein the at least one driving module comprises at least one tilting system configured to tilt the at least one bogie relative to the support frame.

7. The tool carrier according to claim 1, wherein the at least one driving module comprises three driving modules which are disposed around the support frame every 120° around the driving direction.

8. The tool carrier according to claim 1, further comprising at least one tool compartment.

9. The tool carrier according to claim 1, further comprising at least one camera compartment.

10. The tool carrier according to claim 1, further comprising a strap fixed to the support frame.

11. A tool carrier train comprising:

at least two tool carriers, at least one of the tool carriers being the tool carrier according to claim 1.

12. The tool carrier train according to claim 11, further comprising at least one tool compartment which is disposed between the two tool carriers.

13. A tool carrier comprising:

a support frame; and at least one driving module, mounted on the support frame, and the at least one driving module being configured to move the support frame along a driving direction, the at least one driving module comprising two wheels including a front wheel and a rear wheel, at least one motor assembly which is configured to drive at least one wheel among the front wheel and the rear wheel, at least one engaging system which is configured to engage the at least one wheel with the motor assembly or disengage the at least one wheel from the motor assembly, and at least one bogie mounted on the support frame, the front wheel and the rear wheel being mounted on the at least one bogie.

14. A tool carrier comprising:

a support frame; and three driving modules, mounted on the support frame, and the three driving modules being configured to move the support frame along a driving direction, the three driving modules being disposed around the support frame every 120° around the driving direction, each of the three driving modules comprising two wheels including a front wheel and a rear wheel, at least one motor assembly which is configured to drive at least one wheel among the front wheel and the rear wheel, and at least one engaging system which is configured to engage the at least one wheel with the motor assembly or disengage the at least one wheel from the motor assembly.

* * * * *